United States Patent
Wang et al.

(10) Patent No.: US 12,229,919 B2
(45) Date of Patent: Feb. 18, 2025

(54) IMAGE DRAWING METHOD, DISPLAY APPARATUS, AND STORAGE MEDIUM

(71) Applicant: BOE TECHNOLOGY GROUP CO., LTD., Beijing (CN)

(72) Inventors: Xian Wang, Beijing (CN); Xitong Ma, Beijing (CN); Congrui Wu, Beijing (CN); Yanfu Li, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 524 days.

(21) Appl. No.: 17/627,498

(22) PCT Filed: Mar. 25, 2021

(86) PCT No.: PCT/CN2021/083028
§ 371 (c)(1),
(2) Date: Jan. 14, 2022

(87) PCT Pub. No.: WO2021/190606
PCT Pub. Date: Sep. 30, 2021

(65) Prior Publication Data
US 2022/0261971 A1    Aug. 18, 2022

(30) Foreign Application Priority Data
Mar. 27, 2020    (CN) .......................... 202010232239.7

(51) Int. Cl.
*G06T 5/40*    (2006.01)
(52) U.S. Cl.
CPC .................................... *G06T 5/40* (2013.01)
(58) Field of Classification Search
CPC ... G06T 5/40; G06T 5/92; G09G 5/02; G09G 2320/02; H04N 5/57; G06V 10/28
See application file for complete search history.

(56) References Cited

U.S. PATENT DOCUMENTS

| | | | |
|---|---|---|---|
| 8,055,072 B2 * | 11/2011 | Chen ......................... | G06T 5/92 |
| | | | 382/172 |
| 10,818,269 B2 * | 10/2020 | Chen ......................... | H04N 5/57 |
| 2020/0066230 A1 | 2/2020 | Chen et al. | |

FOREIGN PATENT DOCUMENTS

| | | | |
|---|---|---|---|
| CN | 101256751 A | 9/2008 |
| CN | 103366378 A | 10/2013 |

(Continued)

OTHER PUBLICATIONS

Computer English translation of Chinese Patent No. CN107948554A, pp. 1-15. (Year: 2018).*

(Continued)

*Primary Examiner* — Daniel G Mariam
(74) *Attorney, Agent, or Firm* — WHDA, LLP

(57) ABSTRACT

An image drawing method, a display apparatus, and a storage medium, relates to the technical field of display. The method comprises: determining a gray-scale value of each of a plurality of target-pixels in a displayed image; determining a pixel quantity in each preset gray-scale level according to the gray-scale value of each of the plurality of target-pixels; representing a maximum quantity of a plurality of pixel quantities by a first numeral system, to read values in a preset digit range of the digit of the first numeral system corresponding to the maximum quantity, determining a proportional coefficient corresponding to the values, and according to a height of a histogram to be drawn, a gray-scale to be drawn and the proportion coefficient, drawing the histogram.

16 Claims, 4 Drawing Sheets

(56) References Cited

FOREIGN PATENT DOCUMENTS

| | | | |
|---|---|---|---|
| CN | 107948554 A | 4/2018 |
| CN | 108984601 A | 12/2018 |
| CN | 109165058 A | 1/2019 |
| CN | 110533117 A | 12/2019 |
| CN | 111261088 A | 6/2020 |
| JP | H03166666 A | 7/1991 |
| JP | 2000003451 A | 1/2000 |
| JP | 2006033230 A | 2/2006 |
| JP | 2007124453 A | 5/2007 |
| JP | 2010015588 A | 1/2010 |

OTHER PUBLICATIONS

Office Action dated Feb. 25, 2022, issued in counterpart CN Application No. 202010232239.7, with English Translation. (12 pages).
International Search report dated Jun. 2, 2021, issued in counterpart Application No. PCT/CN2021/083028. (3 pages).

\* cited by examiner

The RGB split

The RGB fusion/luminance

IMAGE DRAWING METHOD, DISPLAY APPARATUS, AND STORAGE MEDIUM

CROSS REFERENCE TO RELEVANT APPLICATIONS

This application is based upon and claims priority of the Chinese patent application filed on Mar. 27, 2020 filed to the Chinese Patent Office with the application number of 202010232239.7 and the title of "IMAGE DRAWING METHOD, DISPLAY APPARATUS, AND STORAGE MEDIUM", the entire contents of which are incorporated herein by reference.

TECHNICAL FIELD

The disclosure generally relates to the technical field of display, in particular to an image drawing method, a display device and a storage medium.

BACKGROUND

With the continuous development of display technology, the display apparatus is widely used in various fields. Usually, in order to better analyze the color distribution of displayed image in the display apparatus, it is necessary to draw a histogram corresponding to the displayed image, such as an RGB histogram and a luminance histogram, etc. The abscissa is the gray scales, and the ordinate is the pixel quantity. The RGB histogram may show the pixel quantity distribution of different gray-scales corresponding to each color component, and the luminance histogram may show the pixel quantity distribution of the gay-scales at different luminance.

SUMMARY

The disclosure provides an image drawing method, a display apparatus, and a storage medium.

The disclosure provides an image drawing method, comprises:
  determining a gray-scale value of each of a plurality of target-pixels in a displayed image;
  determining a pixel quantity in each preset gray-scale level according to the gray-scale value of each of the plurality of target-pixels;
  representing a maximum quantity of a plurality of the pixels by a first numeral system, to obtain a digit of the first numeral system corresponding to the maximum quantity, and to read values in a preset digit range of the digit of the first numeral system corresponding to the maximum quantity;
  determining a proportional coefficient corresponding to the values; and
  according to a height of a histogram to be drawn, a gray-scale to be drawn and the proportion coefficient, drawing the histogram.

Optionally, before determining the gray-scale value of each of the plurality of target-pixels in the displayed image, the method further comprises:
  determining a plurality of value ranges which are equally divided, according to a maximum pixel quantity capable to be reached by any of the gray-scales of the displayed image and the height of the histogram to be drawn; wherein the plurality of value ranges are non-coincidence and continuous;
  determining a reciprocal of an intermediate value of each of the value ranges; wherein the intermediate value is an integer;
  multiplying each of the reciprocals by a preset coefficient, to obtain first products, wherein the first products are integers;
  determining a plurality of first storage addresses, according to a quantity of the value ranges; and
  regarding each of the first products as the proportional coefficients, and storing the proportional coefficients from small to large in a plurality of the first storage addresses in a one-to-one correspondence.

Optionally, determining the proportional coefficients corresponding to the values comprises:
  regarding the values as destination storage addresses, and determining the proportional coefficients stored in the destination storage addresses.

Optionally, the quantity of the value ranges is a preset quantity, and the product of the reciprocal of the quantity of the values in the value ranges and the preset coefficient is a preset product.

Optionally, the step of determining the plurality of value ranges which are equally divided, according to the maximum pixel quantity capable to be reached by any of the gray-scales of the displayed image and the height of the histogram to be drawn, comprises:
  dividing the maximum pixel quantity by the height of the histogram to be drawn, to obtain a first quotient value;
  dividing the first quotient value by the preset quantity, to obtain a quantity of the values of each of the value ranges; and
  determining the plurality of value ranges which are equally divided, according to the quantity of the values of each of the value ranges.

Optionally, the digit of the first numeral system corresponding to the maximum quantity is represented by a first data structure, the first data structure comprises a first digit range and a second digit range from a last digit, the first digit range comprises the preset digit range starting from a first digit of the first digit range, values of the first digit range represent the heights of the histogram to be drawn, values of the second digit range represent any value of the value range corresponding to the digit of the first numeral system corresponding to the maximum quantity, values of the preset digit range represent the value range corresponding to the digit of the first numeral system corresponding to the maximum quantity.

Optionally, according to the height of the histogram to be drawn, the gray-scale to be drawn and the proportion coefficients, drawing the histogram, comprises:
  drawing a first gray-scale corresponding to the maximum quantity, according to the height of the histogram to be drawn;
  for any one of second gray-scale to be drawn other than the first gray-scale, multiplying the pixel quantity corresponding to the second gray-scale and the proportional coefficient to obtain second product;
  determining a quotient of the second product and the preset coefficient, to obtain a column height corresponding to the second gray-scale; and
  drawing the histograms according to each of the column heights corresponding to the second gray-scales.

Optionally, drawing the histograms according to each of the column heights corresponding to the second gray-scales comprises:
  for each second gray-scale, subtracting the height of the histogram to be drawn and the column height corresponding to the second gray-scale, to obtain a blank height from the top of the column of the second gray-scale to the height of the histogram to be drawn;

drawing a blank region from the top of the column of the second gray-scale to the height of the histogram to be drawn according to the blank height; and after the blank region is drawn, drawing the column of the second gray-scale according to the column height corresponding to the second gray-scale.

Optionally, the preset coefficient is the $N^{th}$ power of 2, and determining the quotient of the second product and the preset coefficient to obtain the column height corresponding to the second gray-scale, comprises:

for each second gray-scale, representing the second product by a binary system to obtain a binary digit of the second product, and right shifting the binary digit of the second product to a N bit, to obtain the column height corresponding to the second gray-scale.

Optionally, determining the gray-scale value of each of the plurality of target-pixels in the displayed image, comprises:

splitting the displayed image into a plurality of displayed sub-images; and determining a gray-scale value of each of the plurality of target-pixels, of each of the displayed sub-images.

Optionally, the plurality of target-pixels comprise pixels sampled from the displayed sub-images, or all pixels of the displayed sub-images.

Optionally, the step of determining the pixel quantity in each preset gray-scale level, according to the gray-scale value of each of the plurality of target-pixels, comprises:

regarding each of the preset gray-scale levels as a second storage address in a second storage module, wherein a quantity of the second storage addresses is equal to a quantity of the preset gray-scales;

determining the preset gray-scale level corresponding to the gray-scale value of each of the plurality of target-pixels, and storing each of the plurality of target-pixels in a corresponding second storage address, wherein the target-pixels in the plurality of displayed sub-images are stored in the different second storage modules, respectively; and calculating the sum of the pixel quantity belonging to the same second storage address in each of the second storage modules, to obtain the pixel quantity of each of the preset gray-scale levels.

Optionally, the preset gray-scale level is one or more gray-scales.

Optionally, the first numeral system is a binary system.

A display apparatus, wherein the display apparatus comprises a processor, a memory and a computer program stored in the memory and capable to be executed by the processor, and the computer program is executed by the processor to implement the steps of the image drawing method as mentioned above.

A computer readable storage medium, wherein the computer program is stored on the computer readable storage medium and the computer program is executed by the processor to implement the steps of the image drawing method as mentioned above.

A computer program, comprising a computer readable code, when the computer readable code operates on the display apparatus, the display apparatus executes the image drawing method as mentioned above.

The above description is only an overview of the technical scheme of the disclosure. In order to better understand the technical means of the disclosure, the implementation can be carried out in accordance with the contents of the manual, and in order to make the aforesaid and other purposes, features and advantages of the disclosure more obvious and understandable, the specific implementation methods of the disclosure are given below.

BRIEF DESCRIPTION OF THE DRAWINGS

In order to more clearly illustrate the technical solutions of the embodiments of the present application or the prior art, the figures that are required to describe the embodiments or the prior art will be briefly introduced below. Apparently, the figures that are described below are embodiments of the present application, and a person skilled in the art can obtain other figures according to these figures without paying creative work.

DETAILED DESCRIPTION OF THE EMBODIMENTS

In order to make the objects, the features, and the advantages of the embodiments of the present disclosure clearer, the technical solutions of the embodiments of the present disclosure will be clearly and completely described below with reference to the drawings of the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

Figure 1:
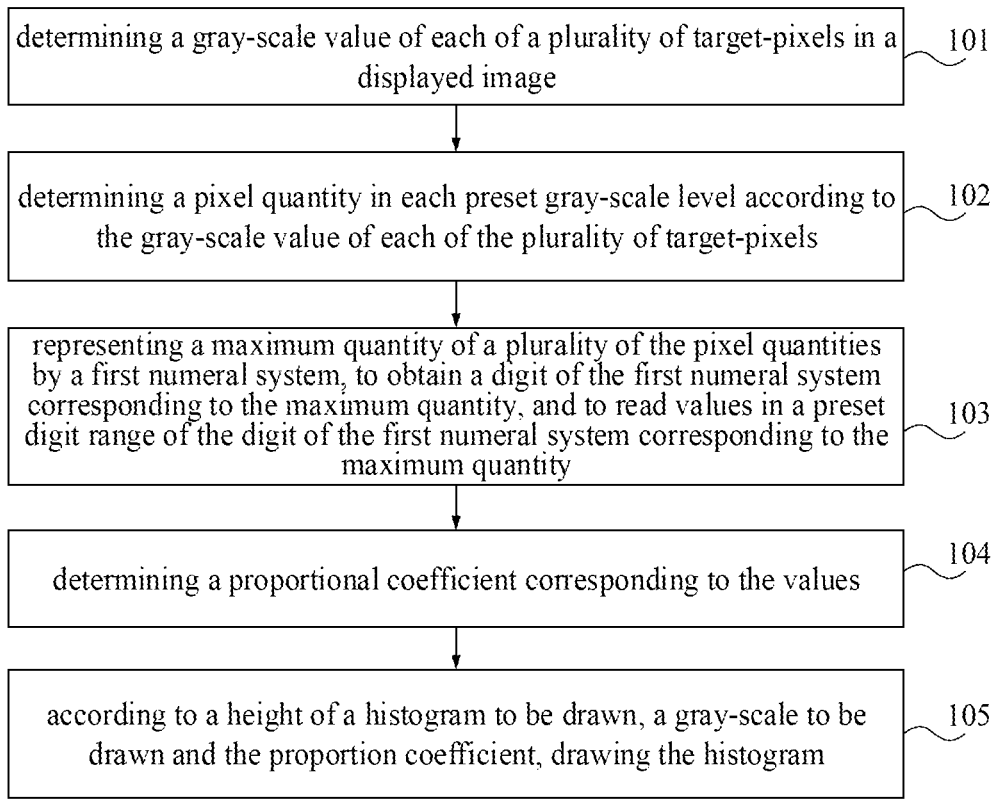
FIG. 1 illustrates a flow chart of an image drawing method according to an embodiment of the disclosure.

Referring to FIG. 1, a flow chart of the steps for an image drawing method of this embodiment of the disclosure is shown, which includes the following steps:

step 101: determining a gray-scale value of each of a plurality of target-pixels in a displayed image.

In this embodiment of the disclosure, the method may be realized by an image drawing apparatus, such as a Field-Programmable Gate Array (FPGA). Correspondingly, the method may be applied for electronic apparatuses including the FPGA, such as high-definition or ultra-high-definition monitors, or high-definition computers. This embodiment of the disclosure does not specify this.

Optionally, step 101 may be realized by the following ways, which including: splitting the displayed image into a plurality of displayed sub-images, and determining a gray-scale value of each of the plurality of target-pixels of each of the displayed sub-images.

Specifically, when the image drawing apparatus receives a displayed image that needs to be displayed, the displayed image may be split into a plurality of displayed sub-images. For example, in the 8K video system, the resolution of the image that can be input is 7680*4320. Optionally, for the displayed image with the resolution of 7680*4320, the displayed image may be divided into 16 regions along the longitudinal direction, to obtain 16 displayed sub-images, wherein the resolution of each of the displayed sub-images is 480*4320.

For any one of the displayed sub-images, the image drawing apparatus may determine the gray-scale value of each of the plurality of target-pixels of each of the displayed sub-images, wherein the plurality of target-pixels may be pixels sampled from the displayed sub-images, or may be all pixels of the sub-images certainly. This embodiment of the disclosure does not specify this.

The samples of the pixels may not only accurately reflect the situation of the overall gray-scales of the image, but also save the time for subsequent statistics of the pixel quantity, to save the time for drawing histograms.

For example, for a displayed sub-image with a resolution of 480*4320, one pixel may be sampled per 4 pixels in a horizontal direction, and traversing all columns in a vertical direction. In practical applications, the pixel sampling may be carried out with a clock signal. Pixel data when each high level of the clock arrives are counted at first, and when the fourth pixel datum comes, the gray-scale value of the fourth pixel datum is recorded. In this way, a displayed sub-image may be collected to obtain the gray-scale values of 480*4320*(1/4)=518400 target-pixels. For the displayed image, which includes 16 displayed sub-images as mentioned above, it may be collected to obtain the gray-scale values of 518400*16=8294400 target-pixels in total.

In practical applications, the data of the gray-scale values of the 16 displayed sub-images may be stored in 16 different second storage modules. Optionally, the second storage modules may be Random-Access Memory (RAM).

Moreover, in practical applications, optionally, this step may parallelly process a plurality of the displayed sub-images, that is, the gray-scale value of each of the plurality of target-pixels, of each of the displayed sub-images, may be determined at the same time. In this way, the time of statistics of the gray-scale values may be saved, so that the time of drawing the histograms may be saved.

In addition, in this embodiment of the disclosure, when analyzing the histograms of different color components, the gray-scale values of the target-pixels may include R (red) gray-scales, G (green) gray-scales and B (blue) gray-scales, or Y (luminance) gray-scales, U (color) gray-scales and V (color) gray-scales, and so on. When it is need to analyze a luminance histogram, the gray-scale values of the target-pixel may include the luminance gray-scales.

Optionally, before this step, the method may further include the following steps from (1) to (5):

(1) determining a plurality of value ranges which are equally divided, according to a maximum pixel quantity capable to be reached by any of the gray-scales of the displayed image and the height of the histogram to be drawn; wherein the plurality of value ranges are non-coincidence and continuous;

In step (1), the maximum pixel quantity that may be achieved by any one of the gray-scales in the displayed image is the sum of the pixel quantity in the entire displayed image. For example, for a displayed image with a resolution of 7680*4320, that is, the maximum pixel quantity that may be achieved by any of the gray-scales is 7680*4320=33177600, that is, the gray-scales of all pixels in the displayed image are the same, such as a pure white or a pure black displayed image.

Figure 2:
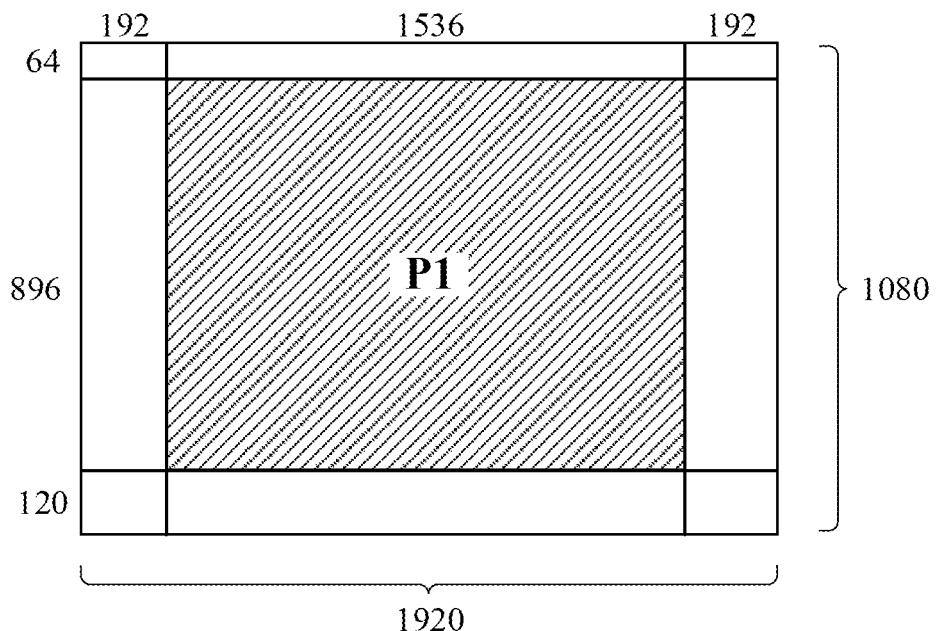
FIG. 2 illustrates a schematic diagram of an effective drawing region of a RGB fusion histogram and a luminance histogram according to an embodiment of the disclosure.
Figure 3:
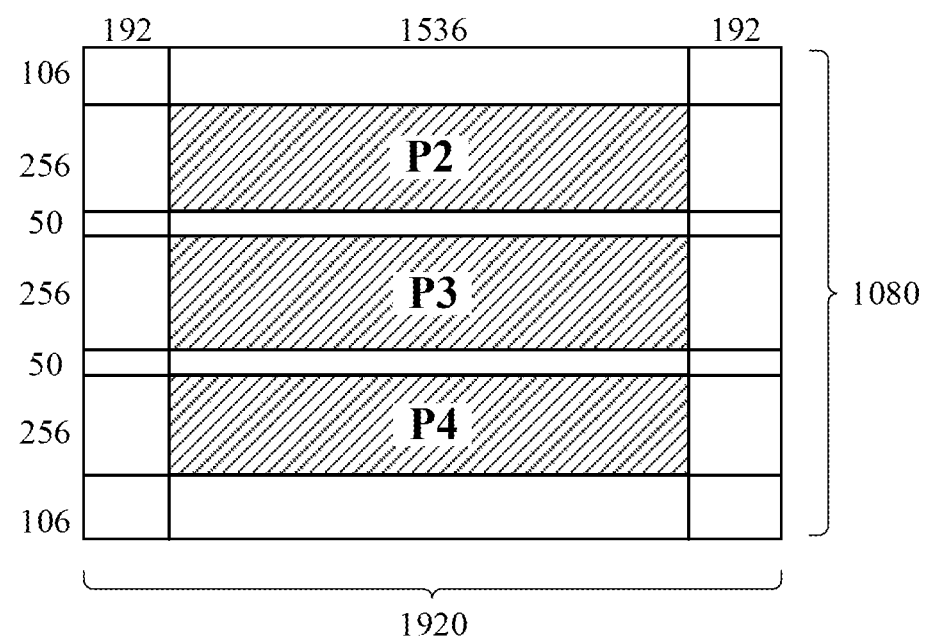
FIG. 3 illustrates a schematic diagram of an effective drawing region of a RGB split histogram according to an embodiment of the disclosure.

FIG. 2 illustrates a diagram of an effective drawing region, of a RGB (red, green, blue) fusion histogram and a luminance histogram, FIG. 3 illustrates a diagram of an effective drawing region, of a RGB split histogram, and the sizes for both of the histograms are 1920*1080. As referring to FIG. 2, there is only one effective drawing region P1, and other regions are blank region, which can be transparently displayed, wherein the size of P1 is 1536*896, therefore, the maximum value of the columns of the RGB fusion histogram and the luminance histogram is 896. As referring to FIG. 3, there are three effective regions P2, P3 and P4, P2, P3 and P4 may be used to draw an R histogram, a G histogram, and a B histogram respectively, and other regions are blank region to be transparently displayed, wherein the sizes of P2, P3 and P4 are all 1536*256, therefore, the maximum value of the columns of the RGB split histogram is 256.

In this embodiment of the disclosure, the column height corresponding to the gray scale with the maximum pixel quantity may be set as the maximum value allowed to be drawn in the effective drawing regions. If the column height corresponding to the gray scale with the maximum pixel quantity is set as k, that is, the column height corresponding to the gray scale with the maximum pixel quantity is drawn according to a certain proportion, then the column heights corresponding to the other gray scales is allocated according to the proportion. For example, in a displayed image, the maximum quantity of gray-scale pixels is max, then the column height corresponding to the maximum quantity of max is set as k, and if there are m pixels in one of the gray-scales which named Q, then the column height corresponding to the gray-scale Q should be m/(max/k).

For example, for the RGB split histogram as shown in FIG. 3, in the displayed image, if the maximum pixel quantity of the gray-scales is max, then the column height corresponding to the maximum quantity max may be set as 256. If the pixel quantity of the gray-scale Q is m, then the column height corresponding to the gray-scale Q should be m/(max/256).

In this embodiment of the disclosure, the height of the histogram to be drawn is the maximum value allowed to be drawn in the effective drawing region of the histogram to be drawn. For example, for the effective drawing region as shown in FIG. 3, the height of the histogram to be drawn is 256. For another example, for the effective drawing region as shown in FIG. 2, the height of the histogram to be drawn is 896, but 896 is not an integer power of 2, which is not conducive to obtain integers in subsequent calculations. Therefore, in practical applications, when the height of the histogram to be drawn is 896, the value of 1024 (which equals to $2^{10}$) may be used to replace 896 in subsequent calculations. In subsequent drawings, all last 7 bit of the binary data of other column heights other than the highest column height may be set to 0. Since the maximum quantity represented by the last 7 bit of the binary data may be 127, theoretically, 1023 is the maximum drawing height that may be achieved by other columns other than the highest column according to the maximum allowable drawing value of 1024. Therefore, the last 7 bit of the binary data of other column heights other than the highest column height are set to 0 (can subtract 127 at most), so that the final drawing column heights may not exceed 896 (1023−127=896). The highest column may eventually be drawn directly to the height of 896 instead of drawing according to 1024, so the heights of all columns may not exceed 896.

It should be noted that the sizes for the histograms and the effective drawing regions as referred to FIG. 2 and FIG. 3 are only illustrated as examples, which do not limit the disclosure.

In step (1), 0 to (the maximum pixel quantity MA/the height k of the histogram to be drawn) may be segmented into a plurality of value ranges which are equally divided, which means that each of the value ranges includes the same quantity of the values.

Optionally, when the quantity of the value ranges is a preset quantity, step (1) may specifically include: determining the plurality of value ranges which are equally divided, according to the maximum pixel quantity capable to be achieved by any of the gray-scales in the displayed image, the height of the histogram to be drawn and the preset quantity.

Specifically, the maximum pixel quantity may be divided by the height of the histogram to be drawn, and then divided by the preset quantity, to obtain a partition interval, while the partition interval represents how many values are included in each of the value ranges.

For example, for the RGB split histogram, when the height of the histogram to be drawn is 256, the preset quantity may be set as 2025, that is, the quantity of the value ranges is 2025, the partition interval=33177600/256/2025=64, that is, 0 to 129600 (MA/k=33177600/256=129600) may be segmented at interval of every 64 values, to obtain [0,63], [64,127] . . . as a total of 2025 (129600/64=2025) value ranges which are equally divided, these value ranges are non-coincidence and continuous, and each of the value ranges includes 64 values.

For another example, for the RGB fusion histogram and the luminance histogram, when the height of the histogram to be drawn is 1024, the preset quantity may be set as 2025, that is, the quantity of the value ranges is 2025, the partition interval=33177600/1024/2025=16, that is, 0 to 32400 (MA/k=33177600/1024=32400) may be segmented at interval of every 16 values, to obtain [0,15], [16,31] . . . as a total of 2025 (32400/16=2025) value ranges which are equally divided. These value ranges are non-coincidence and continuous, and each of the value ranges includes 16 values.

(2) determining a reciprocal of an intermediate value of each of the value ranges; wherein the intermediate value is an integer;

In step (2), the reciprocal of the intermediate value of each of the value ranges may be selected, since each of the value ranges includes even (such as 64) values, therefore, the intermediate value may be selected from either of the two values. For example, the intermediate value of the value range of [0, 63] may be selected as 32, and the intermediate value of the value range of [0, 15] may be selected as 8.

The intermediate value is selected after segmenting, the reciprocal of the intermediate value is calculated. It may be found that for the RGB fusion histogram and the luminance histogram, these reciprocals are actually four times of each of the reciprocals corresponding to the RGB split histogram.

(3) multiplying each of the reciprocals by a preset coefficient, to obtain first products, which the first products are integers;

In step (3), the first products of each of the reciprocals and the preset coefficient can be determined respectively, to expand each of the reciprocals to an integer. Wherein the preset coefficient is used to expand each of the reciprocals to an integer representation, and it is conductive for computation and storage. Optionally, for the RGB split histogram, the preset coefficient may be set as $2^{18}$; for the RGB fusion histogram and the luminance histogram, the preset coefficient may be set as $2^{16}$ ($2^{18}/2^{16}$=4 times).

(4) determining a plurality of first storage addresses according to a quantity of the value ranges.

In step (4), the quantity of the value ranges is M, and M first storage addresses can be determined, optionally, the first storage addresses may start from 0, so that each of the first storage addresses may be respectively determined as 0~(M−1) correspondingly.

For example, the quantity of the value ranges may be 2025, so that 2025 first storage addresses may be determined, and each of the first storage addresses may be respectively determined as 0, 1, 2, . . . , 2023, 2024.

In practical applications, the first storage addresses may be storage addresses included by a first storage module, optionally, the first storage module may be a Read Only Memory (ROM) specifically.

(5) regarding each of the first products as the proportional coefficients, and storing the proportional coefficients from small to large in a plurality of the first storage addresses in a one-to-one correspondence.

In step (5), each of the first products may be used as a proportional coefficient and stored in a plurality of the first storage addresses one by one, in a sequence from small to large. Wherein the smallest first product is stored in the smallest first storage address 0, and the largest first product is stored in the largest first storage address. For example, the smallest first product is stored in the smallest first storage address 0, and the largest first product is stored in the largest first storage address 2024. These proportional coefficients are ROM parameters as well.

In addition, optionally, the quantity of the value ranges is a preset quantity, the product of the reciprocal of the quantity of the values in the value ranges and the preset coefficient, is a preset product.

In this embodiment of the disclosure, when the quantity of the value ranges is the preset quantity, regardless of the maximum pixel quantity or the height of the histogram to be drawn, as long as the quantity of the value ranges is determined (which is equal to the preset quantity), such as 2025, to ensure that the product of the maximum pixel quantity and the height of the histogram to be drawn is unchanged, so that the first storage addresses in step (5) may be ensured to be unchanged, and the first storage addresses are 0~2024.

When the product of the reciprocal of the quantity of the values (which is the partition interval) in the value range and the preset coefficient is the preset product, it may be ensured that the proportional coefficient in step (5) remains unchanged and the proportional coefficient is the first product. For example, the preset product may be $1/64*2^{18}$, for the RGB split histogram, the product of the reciprocal of the quantity of the values in the value range 1/64 and the preset coefficient $2^{18}$ is $1/64*2^{18}$; for the RGB fusion histogram and the luminance histogram, the product of the reciprocal of the quantity of the values in the value range 1/16 and the preset coefficient $2^{16}$ is also equal to $1/64*2^{18}$. In this way, the proportional coefficient in step (5) may be ensured as unchanged, and the proportional coefficient is the first product.

So, under the condition that the quantity of the value range is the preset quantity, and the product of the reciprocal of the quantity of the values in the value range and the preset coefficient is the preset product, the corresponding relationship (ROM parameters) between the first storage addresses and the proportional coefficients in step (5) may be ensured as unchanged. The first storage addresses are 0~2024, and the proportional coefficients are the first products. In this way, the RGB split, the RGB fusion and the luminance histogram are drawn with only one set of ROM parameter, the storage resources may be saved without storing a plurality of sets of ROM parameters.

Certainly, in practical applications, the quantity of values of each of the value ranges, and the quantity of values ranges are also variable. There are a plurality of ROM parameters correspondingly, this embodiment of the disclosure may not specify this.

Step 102: determining a pixel quantity in each preset gray-scale level, according to the gray-scale value of each of the plurality of target-pixels.

In this embodiment of the disclosure, a preset gray-scale level may include a plurality of gray-scales, and a plurality of the gray-scales belonging to the same gray-scale level. Certainly, a preset gray-scale level may include one gray-scale, and the gray-scale is the preset gray-scale level, this embodiment of the disclosure may not specify this. In practical applications, each second storage module may treat each of the preset gray-scale levels as one second storage address, such as there are 512 gray-scale levels, therefore there are 512 second storage addresses in each of the second storage modules.

The second storage module corresponding to the displayed sub-image A is a. For any of the target-pixels in the displayed sub-image A, the image drawing apparatus may determine that the gray-scale values of the target-pixels belonging to the preset gray-scale level X, and the target-pixels may be counted into the address X of the second storage module a for storage.

For example, in a 10-bit system, the values of gray-scales of RGB and YUV of all pixels are between 0~1023, as a total of 1024 gray-scales. In this embodiment of the disclosure, each two of the gray-scales may be calculated as the same gray-scale as a preset gray-scale level. Therefore, the preset gray-scale level is 0~511, as a total of 512 preset gray-scale levels. The 512 preset gray-scale levels may be used as 512 addresses, so each RAM in 16 RAMs has 512 addresses, and the datum corresponding to each of the addresses represents the pixel quantity. For any displayed sub-image corresponding to RAM1, the quantity of the target-pixels of the displayed sub-image in the 512 preset gray-scale levels of RAM1 is recorded. For example, the R gray-scale value of one of the target-pixels=612, then adding 1 to the datum stored in the $306^{th}$ (612/2=306, if the address is counted at the start of 0, the address corresponding to the $306^{th}$ address is represented as 305) address of RAM1, and the initial datum is 0 in each of the storage addresses.

So, after all the statistics of the data corresponding to the 16 displayed sub-images are completed, the data of these 16 RAMs may be taken out and added to get a sum, that is, the pixel quantity belonging to the same address (the same preset gray-scale level) in each of the RAMs can be added to get a sum, to obtain the pixel quantity in each of the preset gray-scale levels.

In this embodiment of the disclosure, it is necessary to count a value for the pixel quantity with the most preset gray-scale levels in the displayed image, and take the value as the highest column to draw histograms. So, in the process of accumulating the pixel quantity, it is necessary to record the pixel quantity with the most preset gray-scale levels, which is to set a comparison mechanism. In the statistical process, the initial value of the maximum quantity may be set as 0, the maximum quantity is updated for each time a higher pixel quantity occurs, and the maximum quantity may be recorded as the max mentioned above.

It should be noted that for the RGB fusion histogram, the columns of the R, the G and the B start to show up from the bottom of the same effective drawing region. Therefore, when selecting the maximum quantity max, the maximum quantities corresponding to all gray-scales of the R, the G and the B should be selected. For the RGB split histogram, the columns of the R, the G and the B start to show up from the bottoms of different effective drawing regions. Therefore, when selecting the maximum quantity of max, the maximum quantities of the gray-scales of the R, the G and the B should be selected, and the column heights of the R, the G and the B corresponding to different gray-scales should be calculated respectively. For the luminance histogram, the maximum quantity of max corresponding to the Y gray-scales is selected when there is only a luminance Y.

Step 103: representing a maximum quantity of a plurality of the pixel quantity by a first numeral system, to obtain a digit of the first numeral system corresponding to the maximum quantity, and to read values in a preset digit range of the digit of the first numeral system corresponding to the maximum quantity;

Optionally, the digit of the first numeral system corresponding to the maximum quantity is represented by a first data structure. The first data structure starts from the last digit, including a first digit range and a second digit range. The first digit range starts from the first digit of the first digit range which includes the preset digit range. The values of the first digit range represent the heights of the histogram to be drawn, the values of the second digit range represent any value of the value range corresponding to the digit of the first numeral system corresponding to the maximum quantity, and the values of the preset digit range represent the value range, corresponding to the digit of the first numeral system of the maximum quantity.

Optionally, the first numeral system is a binary system. Correspondingly, the digit of the first numeral system corresponding to the maximum quantity is a digit of the binary system of the maximum quantity.

In this embodiment of the disclosure, the maximum quantity of each of the pixel quantities may be represented by the binary system. As referred to FIG. 4, the first data structure is shown to represent the maximum quantity of each of the pixel quantities, which may be applied to the drawing of the RGB split histogram. As referred to FIG. 5, another first data structure is shown to represent the maximum quantity of each of the pixel quantities, which may be applied to the drawing of the RGB fusion histogram and the luminance histogram.

Figure 4:
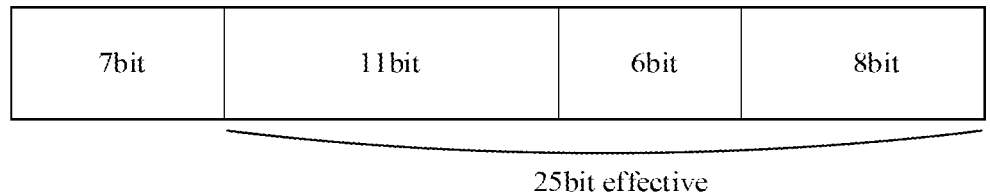
FIG. 4 illustrates a first data structure for representing the maximum quantity of each of the pixel quantities according to an embodiment of the disclosure.
Figure 5:
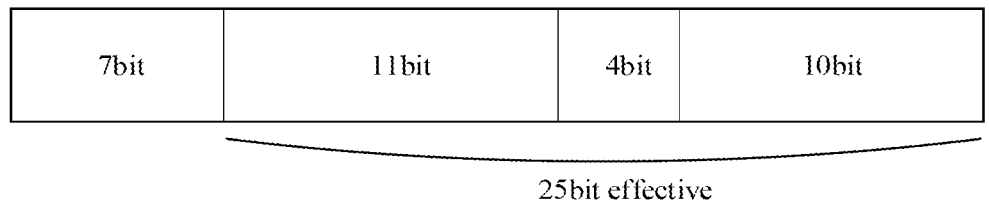
FIG. 5 illustrates another first data structure for representing the maximum quantity of each of the pixel quantities according to an embodiment of the disclosure.

As shown in FIG. 4 and FIG. 5, the maximum quantity max of each of the pixel quantities may be represented by 32 bit, it is 25 bit data since the possible maximum value of the max is 33177600 (**7680*4320**). However, due to the limitation of apparatus operation, it may only calculate the data of the integer power of 2. Therefore, in order to ensure that the 25 bit data is effective, the minimum integer power of 2 and greater than 25 may be selected, which is 32 ($2^5$). As referred to FIG. 4 and FIG. 5, due to the only valid data is the 25 bit data, therefore, the high 7 bits of the 32 bit are default to be 0, as playing a role of placeholder.

In the data structure shown in FIG. 4, the low 8 bits (that is, the $8^{th}$ bit to the $1^{st}$ bit in the first digit range) may represent 256 ($2^8$), that is, the value of the $8^{th}$ to the $1^{st}$ bit, of the digit of the binary system of the maximum quantity, may represent the height of the histogram to be drawn as 256. For the RGB split histogram, since the column height m/(max/256) corresponding to any one of gray-scales Q is needed to be calculated eventually, and the possible maximum value of max is 33177600, so the direct division operation of max/256 may consume a lot of resources. Therefore, the max may be represented by the binary system, and the part of the max/256 may be obtained by ignoring the low 8 bit (which is equivalent to dividing by 256), that is, the 11+6 bits which is of a total of 17 bits in FIG. 4 may represent the size of the max/256, the max/256 is any one of the values in the value range which the digit of the binary system of the maximum quantity belongs to. In this way, the division operation of large values may be avoided and the system resources of the apparatus may be saved.

Similarly, in the data structure shown in FIG. 5, the low 10 bits (which is the $10^{th}$ bit to the $1^{st}$ bit in the first digit range) may represent 1024 ($2^{10}$), that is, the value of the $10^{th}$ to the $1^{st}$ bit in the digit of the binary system of the maximum quantity may represent the height of 1024 of the histogram to be drawn. For the RGB fusion histogram and the luminance histogram, since the column height m/(max/1024) corresponding to any one of the gray-scales Q is needed to be calculated eventually, and the possible maximum value of the max is 33177600, so the direct division operation of the max/1024 may consume a lot of resources. Therefore, the max may be represented by the binary system, and the part of the max/1024 may be obtained by ignoring the low 10 bits (which is equivalent to dividing by 1024), that is, a 11+4 bits which is of a total of 15 bits in FIG. 5 may represent the size of the max/1024, the max/1024 is any one of the values in the value range which the digit of the binary system of the maximum quantity belongs to. In this way, the division operation of large values may be avoided and the system resources of the apparatus may be saved.

In the data structure shown in FIG. 4, under the situation by ignoring the low 8 bits, the middle 6 bits (which is the digit range other than the preset digit range of the second digit range) may represent 0~63 ($2^6-1$). The variation range of the middle 6 bits is always the range of the 64 values no matter what the middle 11 bits are, just as the partition interval of 64 of the value range corresponding to the RGB split histogram. Since that for every 64 values from 0 to (33177600/256) are previously divided into 2025 value ranges, by reading the middle 11 bits ($2^{11}=2048>2025$), that is, the $25^{th}$ to the $15^{th}$ in the 32 bit, it may be obtained that the max/256 belongs to which of the value ranges. That is to say, the $25^{th}$ to the $15^{th}$ bit in the 32 bit may represent the value range corresponding to the digit of the binary system of the maximum quantity. Therefore, for the RGB split histogram, the preset digit range may be set as the $25^{th}$ to the $15^{th}$ bit in the 32 bit.

Similarly, in the data structure shown in FIG. 5, under the situation by ignoring the low 10 bits, the middle 4 bits (which is the digit range other than the preset digit range of the second digit range) may represent 0~15 ($2^4-1$). The variation range of the middle 4 bits is always the range of the 16 values no matter what the middle 4 bits are, just as the partition interval of 16 of the value range corresponding to the RGB fusion histogram and the luminance histogram. Since that for every 16 values from 0 to (33177600/1024) are previously divided into 2025 value ranges, by reading the middle 11 bits ($2^{11}=2048>2025$), that is, the $25^{th}$ to the $15^{th}$ in the 32 bit, it may be obtained that the max/1024 belongs to which of the value ranges. That is to say, the $25^{th}$ to the $15^{th}$ bit in the 32 bit may represent the value range corresponding to the digit of the binary system of the maximum quantity. Therefore, for the RGB split histogram, the preset digit range may be set as the $25^{th}$ to the $15^{th}$ bit in the 32 bit.

In this embodiment of the disclosure, the value of the preset digit range of the digit of the first numeral system corresponding to the maximum quantity obtained by reading, may represent the value range which the max/the height of the histogram to be drawn belongs to. In the previous steps, the quantity of the values of (0~2024) corresponding to the value range is set as 2025 first storage addresses, so the value obtained by reading is one of the first storage addresses.

Specifically, after obtaining the digit of the binary system of the maximum quantity, by the statistics of the max of the displayed image and representing the max by the first numeral system, the max [24:14] may be obtained by reading from the digit of the binary system of the maximum quantity, which is the $25^{th}$ to the $15^{th}$ bit of the digit of the binary system of the maximum quantity.

It is understandable that, the first numeral system may also be a quaternary system and the like. People skilled in this field may set an applicable counting method according to practical applications, and this embodiment of the disclosure does not limit it. For example, the maximum quantity of the pixel quantities is represented by the bit of the quaternary system. For the RGB split histogram, the low 4 bits (which is equivalent to dividing by 256) of the digit of the quaternary system of the maximum quantity may be ignored, to obtain the part of the max/256. For the RGB fusion histogram and the luminance histogram, the low 5 bits (which is equivalent to dividing by 1024) of the digit of the quaternary system of the maximum quantity may be ignored, to obtain the part of the max/1024. In this way, the division operation of large values may be avoided and the system resources of the apparatus may be saved.

Step 104: determining a proportional coefficient corresponding to the values.

In this embodiment of the disclosure, since the proportional coefficient may be stored in the first storage address included by the first storage module (ROM), therefore, this step may be realized by the following ways, including: determining the proportional coefficients stored in destination storage addresses, by treating the values as the destination storage addresses.

Wherein the value of the preset digit range of the digit of the first numeral system of the maximum quantity obtained by reading, may be treated as a destination storage address needed to be queried, and the proportional coefficient stored in the destination storage address may be found from the first storage module.

Specifically, the values of the $25^{th}$ to the $15^{th}$ bit of the digit of the binary system of the maximum quantity may be obtained by reading, through the max [24:14], which is used as the destination storage address needed to be searched. Then, the destination address may be found by searching the address in the first storage module, in order to obtain the proportional coefficient stored in the destination storage address.

Step 105: according to a height of a histogram to be drawn, a gray-scale to be drawn and the proportion coefficient, drawing the histogram.

In this embodiment of the disclosure, optionally, the step may be realized by the following ways, including:

drawing a first gray-scale corresponding to the maximum quantity, according to the heights of the histogram to be drawn;

for any one of second gray-scale to be drawn other than the first gray-scales, multiplying the pixel quantity corresponding to the second gray-scale and the proportion coefficient to obtain second product;

determining a quotient of the second product and the preset coefficient to obtain column height corresponding to the second gray-scale; and drawing the histograms according to each of the column heights corresponding to the second gray-scales.

Wherein for the first gray-scales corresponding to the maximum quantity max, it may be drawn as a maximum allowable height of the effective drawing region, which is the height of the histogram to be drawn. For the RGB split histogram, the column height of the first gray-scale corresponding to the maximum quantity max may be drawn to the height of the histogram to be drawn as 256. For the RGB fusion histogram and the luminance histogram, the column height of the first gray-scale corresponding to the maximum quantity max may be drawn to the height of the histogram to be drawn as 896, rather than the alternative value 1024 of the height of the histogram to be drawn during the calculation.

In addition, for any one of the second gray-scale to be drawn other than the first gray-scale, that is, for the gray-scale with the pixel quantity less than the maximum quantity max, the second product of the pixel quantity corresponding to the second gray-scale and the proportional coefficient may be determined, and then the quotient of the second product and the preset coefficient may be determined, to obtain the column height corresponding to the second gray-scale. In order to facilitate calculation and storage, each of the reciprocals is expanded to an integer through the preset coefficient, so that the proportional coefficient expands the multiple times of the preset coefficient. Therefore, the quotient of the second product and the preset coefficient may be determined here again, so that the second product may be reduced to the multiple times of the preset coefficient. In simple terms, the reciprocal of the intermediate value of the value range is expanded by $2^n$ times to make it an integer, and then multiplied by the pixel quantity of m of one of the gray scales, and finally reduced by $2^n$ times to make the column heights of the gray-scales back to the correct range. Then, according to the column heights corresponding to the second gray-scales that are reduced to the correct range, the columns corresponding to the second gray-scales in the histogram may be drawn.

It should be noted that, for the RGB fusion histogram and the luminance histogram, when the column heights corresponding to the second gray-scales are expressed as binary, the last 7 bit should be set as 0, so that the column heights do not exceed 896.

In addition, optionally, the pixel quantity corresponding to each of the gray-scales may be read from the second storage module, such as RAM.

In this embodiment of the disclosure, since the column corresponding to the maximum quantity is drawn as the allowable maximum height, and the heights of other columns may be allocated according to the scaling ratio of the column heights corresponding to the maximum quantity. Therefore, no matter what displayed image is received, the drawn histogram may maintain a suitable height, and realizing the dynamic adjustment of height, so that the effective drawing height is basically concentrated in the waist of the histogram, so that the gray-scale concentration of the displayed image may be clearly displayed, which is convenient for analysis and processing.

Optionally, the step of drawing the histograms according to each of the column heights according to the second gray-scale may specifically includes:

for each second gray-scale, subtracting the height of the histogram to be drawn and the column height corresponding to the second gray-scale, to obtain a blank height from the columns top of the second gray-scale to the height of the histogram to be drawn;

drawing a blank region from the top of the column of the second gray-scale to the height of the histogram to be drawn, according to the blank height; and after the blank region is drawn, drawing the column of the second gray-scale, according to the column height corresponding to the second gray-scale.

Figure 6:
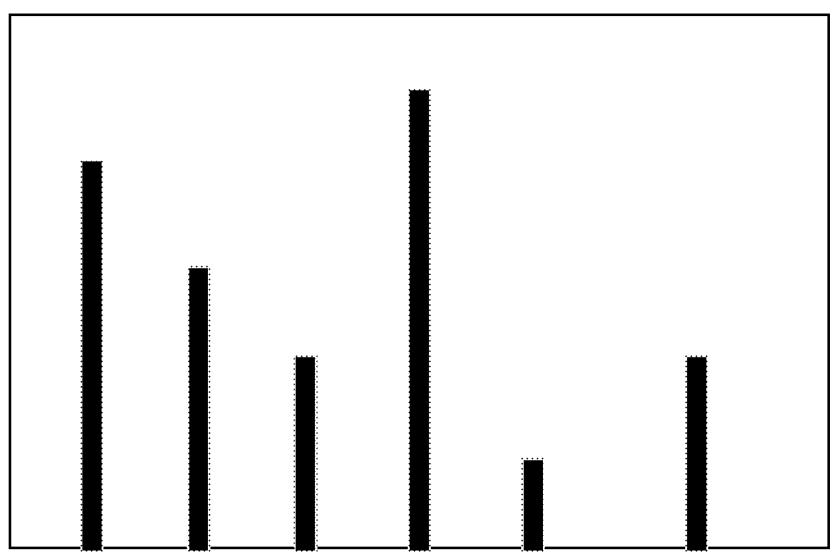
FIG. 6 illustrates a partial schematic diagram of a histogram according to an embodiment of the disclosure.

FIG. 6 illustrates a partial schematic diagram of a histogram. As referred to FIG. 6, since the pixel quantity represented by columns is counted from bottom to top when drawing the histogram. However, the drawing time sequence is similar to the display time sequence, which are drawn from the top to the bottom. Therefore, for the second gray-scales of the column heights less than the heights of the histogram to be drawn, it is necessary to draw the blank region above the columns first, and then draw the columns. Accordingly, it is necessary to determine the height of the blank region above the columns. After the blank region is drawn, the columns below the blank region are drawn according to the heights of the columns.

Specifically, determining the difference values between the heights of the columns corresponding to the second gray-scales of the heights of the histogram to be drawn first, which is to determine the height from the top of the effective drawing region to the top of the column of the second gray-scale. This part of the height is the blank height of the blank region above the columns of the second gray-scales. Then, the blank region above the columns of the second gray-scales may be drawn according to the blank height. When the blank region is drawn, the columns of the second gray-scales may be drawn according to the column heights corresponding to the second gray-scales.

Counts are made from the top to the bottom during the process of drawing, for example, the height of the blank region may be drawn as 96 pixels, and the blank region may be drawn when the count is less than 96, and the columns may be drawn when the count is greater than or equal to 96.

Optionally, in the case of that the preset coefficient is N power of 2, the steps of determining the quotient of the second product and the preset coefficient, and obtaining the column height corresponding to the second gray-scale, may specifically include: for each second gray-scale, representing the second product by the binary system to obtain a binary digit of the second product, and obtaining column height corresponding to the second gray-scale, by right shifting the binary digits of the second products to a N bit.

Wherein in the case of that the preset coefficient is N power of 2, the rule that shifting the binary digits to the right is equivalent to the division operation may be used, the second products may be represented by the binary system as the binary digits of the second products, and then the binary digits of the second products are right shifted to a N bit, which is equivalent to dividing the second products by the preset coefficient, to determine the values obtained after shifting to the right as the column heights corresponding to the second gray-scales. In this way, the division operation for large values may be avoided and the system resources of the apparatus may be saved.

As referred to FIG. 2 and FIG. 3, an image of a 1920*1080 histogram is drawn eventually, during the process of drawing, each of the 512 gray-scales may be represented by 3 pixels, and for the horizontal direction is 512*3=1536.

In summary, the main process of drawing histograms may be summarized as follows: first, the maximum quantity max of pixels in the displayed image is counted, and the max is represented by the binary system. After obtaining the digit of the binary system of the maximum quantity, the $25^{th}$ to the $15^{th}$ bit may be read from the digit of the binary system of the maximum quantity. Then the values obtained by reading may be treated as the destination storage addresses, and the proportional coefficients (which has been expanded by $2^n$ times) stored in the destination storage addresses may be found from ROM, and then the histograms may be drawn. Specifically, for the column of the first gray-scale corresponding to the max, it may be directly drawn as the maximum allowable height of the effective drawing region. For the other second gray-scales with the quantities of the pixels less than the max, the quantities of pixels corresponding to the second gray-scales may be multiplied by the proportional coefficients, and then reduced by $2^n$ times, to obtain the column heights corresponding to the second gray-scales, and then the columns of the second gray-scales may be drawn according to the column heights, thus the histogram may be drawn.

In this embodiment of the disclosure, a gray-scale value of each target-pixel in a displayed image may be determined at first. Then, according to the gray-scale value of each of the plurality of target-pixels, the pixel quantity in each preset gray-scale may be determined. Then, the maximum pixel quantity in each of the pixels may be represented by the first numeral system, the digit of the first numeral system corresponding to the maximum quantity may be obtained, and the value of the preset value range of the digit of the first numeral system corresponding to the maximum quantity may be read, and then the proportional coefficient corresponding to the value may be found. Finally, the histogram may be drawn according to the heights of the histogram to be drawn, the gray-scales to be drawn and the found proportional coefficients. In this embodiment of the disclosure, the drawing required proportional coefficients may be determined according to the maximum pixel quantity in the gray scale, and the column heights corresponding to the gray-scales to be drawn, may be drawn according to the proportional coefficients, so that each of the column heights may be allocated proportionally. Thus, in the drawn histogram, the higher columns and the lower columns may maintain the appropriate display heights, and the effective drawing heights are basically concentrated at the waist of the histogram, so that the concentration of the gray-scales of the displayed image may be clearly displayed, which is convenient for analysis and processing.

This embodiment of the disclosure further discloses a display apparatus, includes a processor, a memory and a computer program stored in the memory and capable to be executed by the processor, and the computer program is executed by the processor to realize the steps of the image drawing method as mentioned above.

This embodiment of the disclosure further discloses a computer readable storage medium, wherein the computer program is stored on the computer readable storage medium and the computer program is executed by the processor to realize the steps of the image drawing method as mentioned above.

For the implementation examples of the above methods, in order to describe them simply, they are expressed as a series of action combinations. However, technical personnel in this field should know that this disclosure is not limited by the described action sequence, because according to this disclosure, some steps may be carried out in other sequences or at the same time. Secondly, the technical personnel in this field should also know that the implementation described in the instructions are all preferred implementation cases, and the actions and modules involved are not necessarily necessary for the disclosure.

The apparatus implementation cases described above are only schematic, in which the units described as the separation components may be or may not be physically separated, and the shown as units may be or may not be physical units, that is, they may be located in one place or may be distributed to multiple network units. Some or all of the modules may be selected according to the actual needs to achieve the purpose of this implementation scheme. Ordinary technicians in this field may understand and implement without paying creative labor.

The implementation examples of each component in this paper may be realized by hardware, or by software modules running on one or more processors, or by their combination. Technicians in this field should understand that microprocessors or digital signal processors (DSP) may be used in practice to achieve some or all of the functions of some or all parts of the display device according to this public embodiment. This disclosure may also be implemented as part or all of the equipment or apparatus used to implement the method described here (for example, computer programs and computer program products). This open program may be stored in a computer readable medium, or may have one or more signals. Such signals may be downloaded from the Internet site, or provided on the carrier signal, or provided in any other form.

Figure 7:
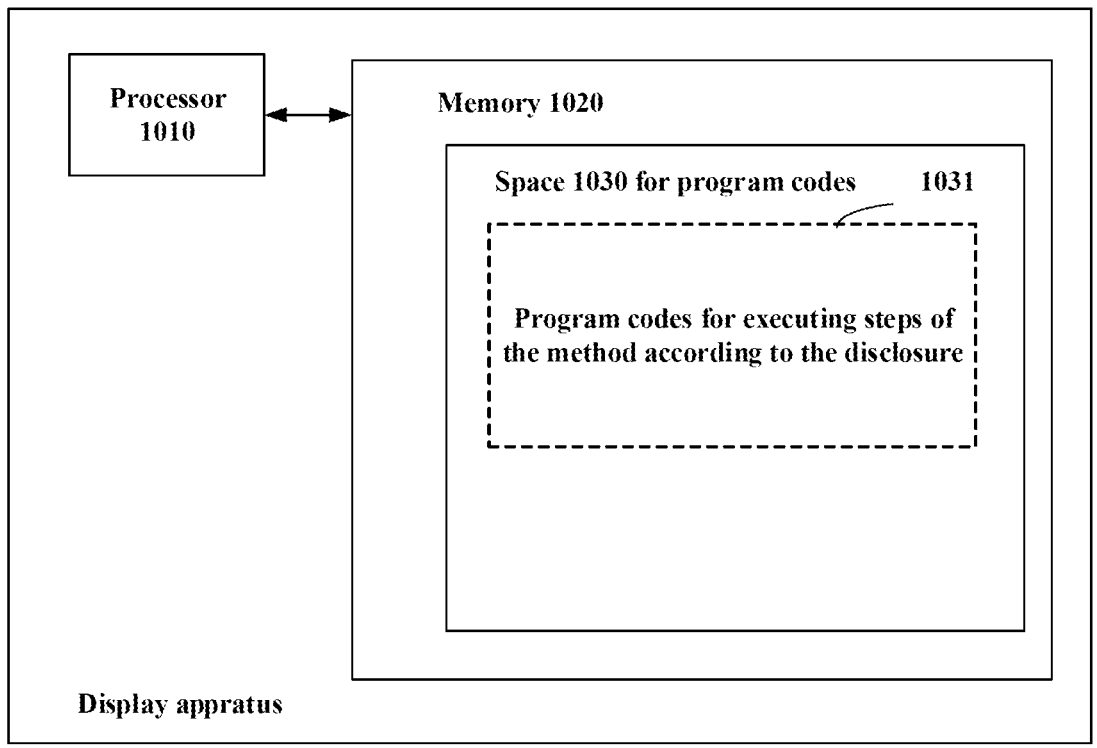
FIG. 7 illustrates a block diagram of the display apparatus used to execute the method according to the disclosure.
Figure 8:
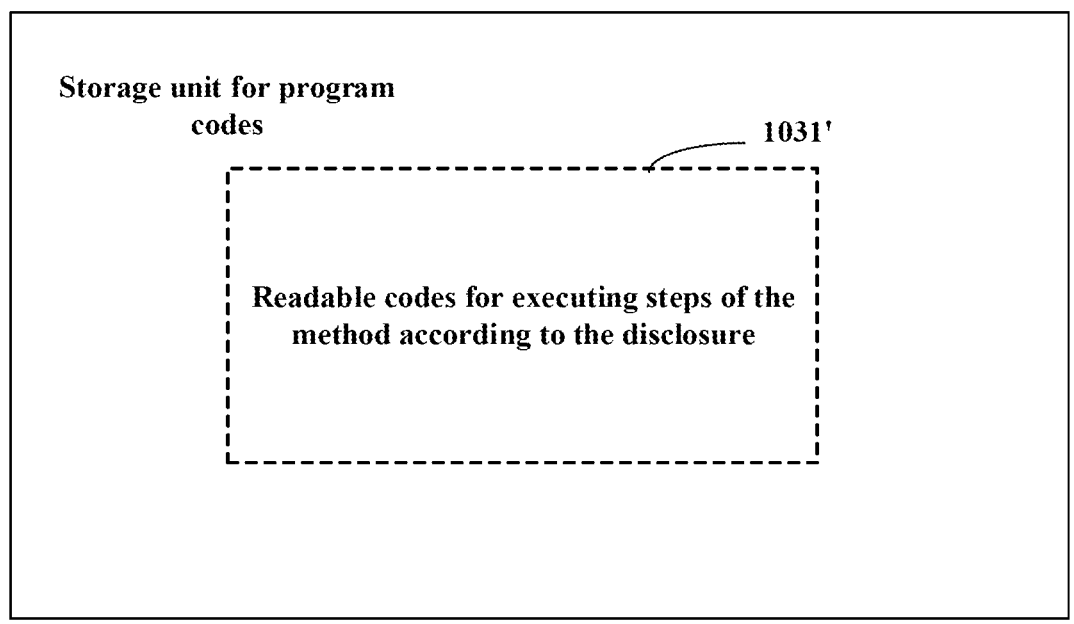
FIG. 8 illustrates a storage unit used to maintain or carry the program code for achieving the method according to the disclosure.

For example, FIG. 7 shows a display apparatus that may implement the method exposed according to this. The display apparatus traditionally includes a processor 1010 and a computer program product or computer readable medium in the form of memory 1020. Memory 1020 may be an electronic memory such as flash memory, EEPROM (electrically erasable programmable Read-only memory), EPROM, hard disk, or ROM. Memory 1020 has storage 1030 for program code 1031 for performing any of the method steps described above. For example, storage 1030 for program code could include individual program code 1031 for implementing the various steps in the method above. The program code may be read from or written to one or more computer program products. These computer program products include program code carriers such as hard disks, compact disks (CDS), memory cards, or floppy disks. Such computer program products are usually portable or stationary storage units as described in FIG. 8. The storage unit may have segments, storage space, and so on arranged in a manner similar to memory 1020 in the display device in FIG. 7. The program code may, for example, be compressed in an appropriate form. Typically, the storage unit includes computer-readable code 1031', that is, code that may be read by a processor such as 1010, which, when run by a display unit, causes the display unit to perform the steps in the method described above.

All embodiments in this manual are described in a progressive manner. Each embodiment focuses on the differences with other embodiments, and the same and similar parts among all embodiments may be referred to each other.

Finally, it should be noted that, in this article, relational terms such as first and second are used only to distinguish one entity or operation from another, and do not necessarily require or imply any such actual relationship or order between these entities or operations. Also, the term "comprise" and "include" or any of its other variants is intended to cover a non-exclusive contain, which enables the process, method, product or equipment including a series of elements to include not only those elements, but also include other elements not list clearly, or also include inherent elements for the process, method, product or equipment. Without further restriction, the element defined by the statement "includes a . . . " does not exclude the existence of other identical elements in the process, method, goods or equipment that includes the element.

An image drawing method, a display apparatus and a storage medium provided in this disclosure are introduced in detail above. In this paper, specific cases are applied to illustrate the principle and implementation of this disclosure. The above embodiments are only used to help understand the disclosed method and its core ideas; at the same time, for the general technical personnel in this field, there will be changes in the specific implementation mode and application scope according to the ideas of this disclosure. In summary, the contents of this manual shall not be understood as restrictions on this disclosure.

The invention claimed is:

1. An image drawing method, wherein the method comprises:
   determining a gray-scale value of each of a plurality of target-pixels in a displayed image;
   determining a pixel quantity in each preset gray-scale level according to the gray-scale value of each of the plurality of target-pixels;
   representing a maximum quantity of a plurality of pixel quantities by a first numeral system, to obtain a digit of the first numeral system corresponding to the maximum quantity, and to read values in a preset digit range of the digit of the first numeral system corresponding to the maximum quantity;
   determining a proportional coefficient corresponding to the values; and
   according to a height of a histogram to be drawn, a gray-scale to be drawn and the proportion coefficient, drawing the histogram, and
   wherein before determining the gray-scale value of each of the plurality of target-pixels in the displayed image, the method further comprises:
   determining a plurality of value ranges which are equally divided according to a maximum pixel quantity capable to be reached by any of the gray-scales of the displayed image and the height of the histogram to be drawn; wherein the plurality of value ranges are non-coincidence and continuous;
   determining a reciprocal of an intermediate value of each of the value ranges; wherein the intermediate value is an integer;
   multiplying each of the reciprocals by a preset coefficient to obtain first products, wherein the first products are integers;
   determining a plurality of first storage addresses according to a quantity of the value ranges; and
   regarding each of the first products as the proportional coefficients, and storing the proportional coefficients from small to large in a plurality of first storage addresses in a one-to-one correspondence.

2. The method according to claim 1, wherein determining the proportional coefficients corresponding to the values comprises:

regarding the values as destination storage addresses, and determining the proportional coefficients stored in the destination storage addresses.

3. The method according to claim 1, wherein the quantity of the value ranges is a preset quantity, and the product of the reciprocal of the quantity of the values in the value ranges and the preset coefficient is a preset product.

4. The method according to claim 3, wherein the step of determining the plurality of value ranges which are equally divided according to the maximum pixel quantity capable to be reached by any of the gray-scales of the displayed image and the height of the histogram to be drawn, comprises:
   dividing the maximum pixel quantity by the height of the histogram to be drawn to obtain a first quotient value;
   dividing the first quotient value by the preset quantity to obtain a quantity of the values of each of the value ranges; and
   determining the plurality of value ranges which are equally divided according to the quantity of the values of each of the value ranges.

5. The method according to claim 1, wherein the digit of the first numeral system corresponding to the maximum quantity is represented by a first data structure, the first data structure comprises a first digit range and a second digit range from a last digit, the first digit range comprises the preset digit range starting from a first digit of the first digit range, values of the first digit range represent the heights of the histograms to be drawn, values of the second digit range represent any value of the value range corresponding to the digit of the first numeral system corresponding to the maximum quantity, values of the preset digit range represent the value range corresponding to the digit of the first numeral system corresponding to the maximum quantity.

6. The method according to claim 1, wherein according to the height of the histogram to be drawn, the gray-scales to be drawn and the proportion coefficients, drawing the histogram, comprises:
   drawing a first gray-scale corresponding to the maximum quantity according to the heights of the histogram to be drawn;
   for any one of second gray-scale to be drawn other than the first gray-scale, multiplying the pixel quantity corresponding to the second gray-scale and the proportional coefficient to obtain a second product;
   determining a quotient of the second product and the preset coefficient to obtain a column height corresponding to the second gray-scale; and
   drawing the histograms according to each of the column heights corresponding to the second gray-scales.

7. The method according to claim 6, wherein drawing the histograms according to each of the column heights corresponding to the second gray-scales comprises:
   for each second gray-scale, subtracting the height of the histogram to be drawn and the column height corresponding to the second gray-scale, to obtain a blank height from the top of the column of the second gray-scale to the height of the histogram to be drawn;
   drawing a blank region from the top of the column of the second gray-scale to the height of the histogram to be drawn according to the blank height; and
   after the blank region is drawn, drawing the column of the second gray-scale according to the column height corresponding to the second gray-scale.

8. The method according to claim 6, wherein the preset coefficient is the $N^{th}$ power of 2, and determining the quotient of the second product and the preset coefficient to obtain the column height corresponding to the second gray-scale, comprises:

for each second gray-scale, representing the second product by a binary system to obtain a binary digit of the second product, and right shifting the binary digit of the second product to N bit to obtain the column height corresponding to the second gray-scale.

9. The method according to claim 1, wherein determining the gray-scale value of each of the plurality of target-pixels in the displayed image comprises:

splitting the displayed image into a plurality of displayed sub-images; and determining a gray-scale value of each of the plurality of target-pixels of each displayed sub-image.

10. The method according to claim 9, wherein the plurality of target-pixels comprise pixels sampled from the displayed sub-images, or all pixels of the displayed sub-images.

11. The method according to claim 9, wherein the step of determining the pixel quantity in each preset gray-scale level according to the gray-scale value of each of the plurality of target-pixels, comprises:

regarding each of the preset gray-scale levels as a second storage address in a second storage module, wherein a quantity of the second storage addresses is equal to a quantity of the preset gray-scales;

determining the preset gray-scale level corresponding to the gray-scale value of each of the plurality of target-pixels, and storing each of the plurality of target-pixels in a corresponding second storage address, wherein the target-pixels in the plurality of displayed sub-images are stored in the different second storage modules, respectively; and calculating the sum of the pixel quantity belonging to the same second storage address in each of the second storage modules to obtain the pixel quantity of each of the preset gray-scale levels.

12. The method according to claim 1, wherein the preset gray-scale level is one or more gray-scales.

13. The method according to claim 1, wherein the first numeral system is a binary system.

14. A display apparatus, wherein the display apparatus comprises a processor, a memory and a computer program stored in the memory and capable to be executed by the processor, and the computer program is executed by the processor to implement the steps of the image drawing method according to claim 1.

15. A non-transitory computer readable storage medium, wherein the computer program is stored on the non-transitory computer readable storage medium and the computer program is executed by the processor to implement the steps of the image drawing method according to claim 1.

16. A computer program, comprising a computer readable code, wherein the computer readable code is stored in a non-transitory computer readable storage medium, when the computer readable code operates on the display apparatus, the display apparatus executes the image drawing method according to claim 1.

* * * * *